United States Patent
Arndt et al.

(10) Patent No.: US 9,027,021 B2
(45) Date of Patent: May 5, 2015

(54) CONTROLLING DEPTH AND LATENCY OF EXIT OF A VIRTUAL PROCESSOR'S IDLE STATE IN A POWER MANAGEMENT ENVIRONMENT

(75) Inventors: Richard L. Arndt, Austin, TX (US); Naresh Nayar, Rochester, MN (US); Christopher Francois, Shakopee, MN (US); Karthick Rajamani, Austin, TX (US); Freeman L. Rawson, III, Austin, TX (US); Randal C. Swanberg, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 483 days.

(21) Appl. No.: 13/445,051

(22) Filed: Apr. 12, 2012

(65) Prior Publication Data
US 2012/0198452 A1 Aug. 2, 2012

Related U.S. Application Data

(63) Continuation of application No. 12/645,597, filed on Dec. 23, 2009, now Pat. No. 8,341,628.

(51) Int. Cl.
G06F 9/455 (2006.01)
G06F 1/00 (2006.01)

(52) U.S. Cl.
CPC ........ *G06F 9/45533* (2013.01); *G06F 9/45541* (2013.01); *G06F 2009/45575* (2013.01)

(58) Field of Classification Search
None
See application file for complete search history.

(56) References Cited

U.S. PATENT DOCUMENTS 8,341,628 B2    12/2012    Arndt et al.

OTHER PUBLICATIONS

U.S. Appl. No. 12/645,597 entitled "Controlling Depth and Latency of Exit of a Virtual Processor's Idle State in a Power Management Environment"; Non-final office action dated Apr. 27, 2012 (12 pp).
U.S. Appl. No. 12/645,597 entitled "Controlling Depth and Latency of Exit of a Virtual Processor's Idle State in a Power Management Environment"; Notice of allowance dated Aug. 15, 2012 (5 pp).

*Primary Examiner* — Kenneth Tang
(74) *Attorney, Agent, or Firm* — Russell Ng PLLC; Matthew Talpis

(57) ABSTRACT

A mechanism is provided in a logically partitioned data processing system for controlling depth and latency of exit of a virtual processor's idle state. A virtualization layer generates a cede latency setting information (CLSI) data. Responsive to booting a logical partition, the virtualization layer communicates the CLSI data to an operating system (OS) of the logical partition. The OS determines, based on the CLSI data, a particular idle state of a virtual processor under a control of the OS. Responsive to the OS calling the virtualization layer, the OS communicates the particular idle state of the virtual processor to the virtualization layer for assigning the particular idle state and wake-up characteristics to the virtual processor.

8 Claims, 7 Drawing Sheets

Cede Latency Settings Information (CLSI) Record 400

| Order of fields within a record | Field Length (in bytes) 408 | Values 410 |
|---|---|---|
| Cede Latency Specifier Value 402 | 1 | 0 through 255 |
| Maximum Wakeup Latency In Time Base Ticks 404 | 8 | 0x0000000000000000 through 0xFFFFFFFFFFFFFFFF |
| Virtual Processor Responsive to... 406 | 1 | Binary True or False |

CONTROLLING DEPTH AND LATENCY OF EXIT OF A VIRTUAL PROCESSOR'S IDLE STATE IN A POWER MANAGEMENT ENVIRONMENT

This application is a continuation of U.S. patent application Ser. No. 12/645,597 entitled "CONTROLLING DEPTH AND LATENCY OF EXIT OF A VIRTUAL PROCESSOR'S IDLE STATE IN A POWER MANAGEMENT ENVIRONMENT" by Richard L. Arndt et al. filed Dec. 23, 2009, the disclosure of which is hereby incorporated herein by reference in its entirety for all purposes.

BACKGROUND

The present application relates generally to an improved data processing apparatus and method and more specifically to mechanisms for controlling depth and latency of exit of a virtual processor's idle state in a power management environment.

There is an emerging customer requirement for better power and thermal management in server systems. Customers increasingly expect systems to behave in such a way as to be power-efficient. Customers also want the ability to set policies that trade off power and performance in order to meet their particular objectives. For example, customers want to be able to over-provision their installations relative to the nominal maximum power and temperature values of the systems that they install, but be able to take advantage of the variability in workloads and utilization to ensure that the systems operate correctly and within the limits of the available power and cooling.

IBM®'s EnergyScale™ system controls the power and temperature of running systems in a performance-aware manner under the direction of a set of policies and objectives specified through EnergyScale™ system's user interfaces. To do so, the EnergyScale™ system implements detailed, periodic measurement of processor core power and temperature, measurement of the power consumed by the entire system board as well as any plugged-in processor cards and measurement of the memory power and temperature to the system. EnergyScale™ system uses the results of these measurements to adjust the system's operation and configuration to meet specified objectives for power, temperature, and performance by using closed-loop feedback control operating in real time.

One of the tools used by the EnergyScale™ system to control power is to adjust the frequency and voltage of the processor chips and cores in the system to control the power dissipation as a function of the user specified energy scale policy. Early EnergyScale™ system designs required that the voltage and frequency of all central processing units (CPUs) in the system be maintained at the same value. As the EnergyScale™ system design and implementation becomes more sophisticated, it becomes possible to have cores in a system running at different frequencies and voltages and allows the implementation of more sophisticated power savings algorithms. A side effect of the more sophisticated implementation is that energy savings opportunities increase with the increasing granularity of the EnergyScale™ system design.

One of the enhancements to the EnergyScale™ system design is the ability to set an idle state from among different possible idle states of a processor core. A processor core in an idle state saves power by not executing instructions. The amount of power saved depends on the amount of the processor's resources that can be disabled when entering the idle state. The greater the amount of the processor resource that is turned off, the greater the power savings, and correspondingly the greater the latency of exit when exiting the idle state and re-enabling those processor resources that were previously disabled. The greater latency in exiting the idle state translates to greater processor resources that have to be enabled when exiting the idle stage.

On a logically partitioned system, when an operating system (OS) determines that its thread in a dedicated processor partition is idle, the OS calls a virtualization layer (i.e., such as a hypervisor) so that the virtualization layer can place the central processing unit (CPU) corresponding to the virtual processor in a low power idle state.

However, when the OS calls the virtualization layer, the OS has different expectations regarding the latency of exit from an idle state of the virtual processor. When referring to the phrase "latency of exit from an idle state", one is referring to the measure of how quickly the OS will regain control of its virtual processor after a qualifying event wakes up the virtual processor from its idle state. For example, if the OS is folding its virtual processor, the OS may not have an expectation that the virtual processor will respond to Input/Output (I/O) or timer interrupts. Moreover, the OS expects to regain control of the virtual processor in at most, for example, one second after the virtual processor is awakened by the OS. In other cases for idle management, the OS may tolerate a latency of only a few micro-seconds when the virtual processor exits its idle state and the OS expects the same latency when the virtual processor is presented an I/O or timer interrupt.

SUMMARY

In one illustrative embodiment, a method, in a logically partitioned data processing system, is provided for controlling the depth and latency of exit of a virtual processor's idle state. The illustrative embodiments generate a cede latency setting information (CLSI) data. The illustrative embodiments determine whether a logical partition has booted or has migrated. The illustrative embodiments communicate the CLSI data to an operating system (OS) of the logical partition. The illustrative embodiments determine a particular idle state of a virtual processor under a control of the OS. The particular idle state is determined based upon the CLSI data. The illustrative embodiments then communicate the particular idle state of the virtual processor to a virtualization layer in response to the OS calling the virtualization layer.

In other illustrative embodiments, a computer program product comprising a computer useable or readable medium having a computer readable program is provided. The computer readable program, when executed on a computing device, causes the computing device to perform various ones, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

The illustrative embodiments provide a mechanism for controlling the depth and latency of exit of a CPU corresponding to a virtual processor's idle state. The mechanism allows the OS of a logical partition to make the correct decision with regard to the type of idle state that should be assigned to one or more of its virtual processors. This ensures that there are no unacceptable delays in the OS resuming control of the idle virtual processor when the OS requires the idle virtual processor's resources.

Figure 1:
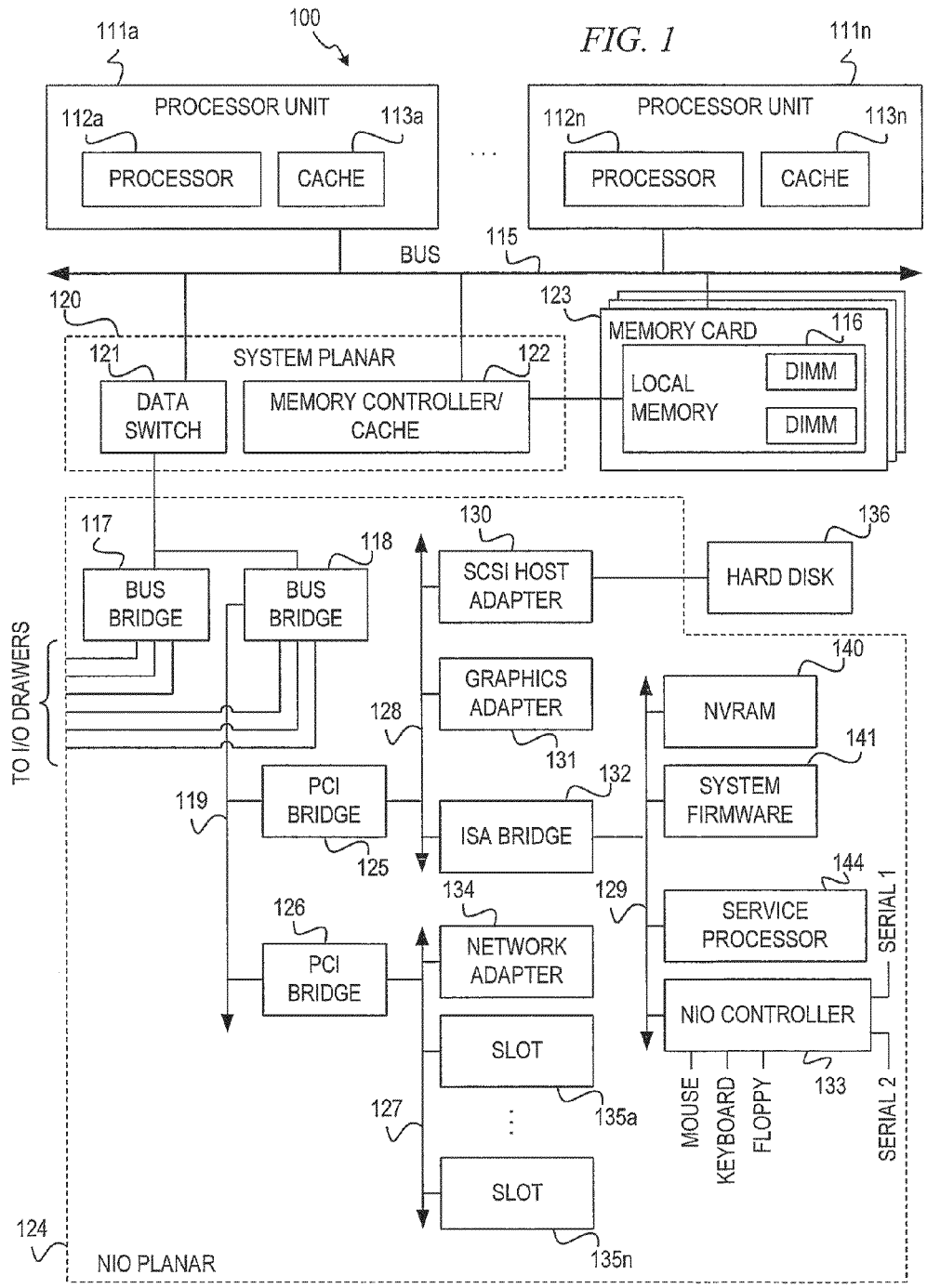
FIG. 1 depicts a block diagram of a data processing system with which aspects of the illustrative embodiments may advantageously be utilized.
Figure 2:
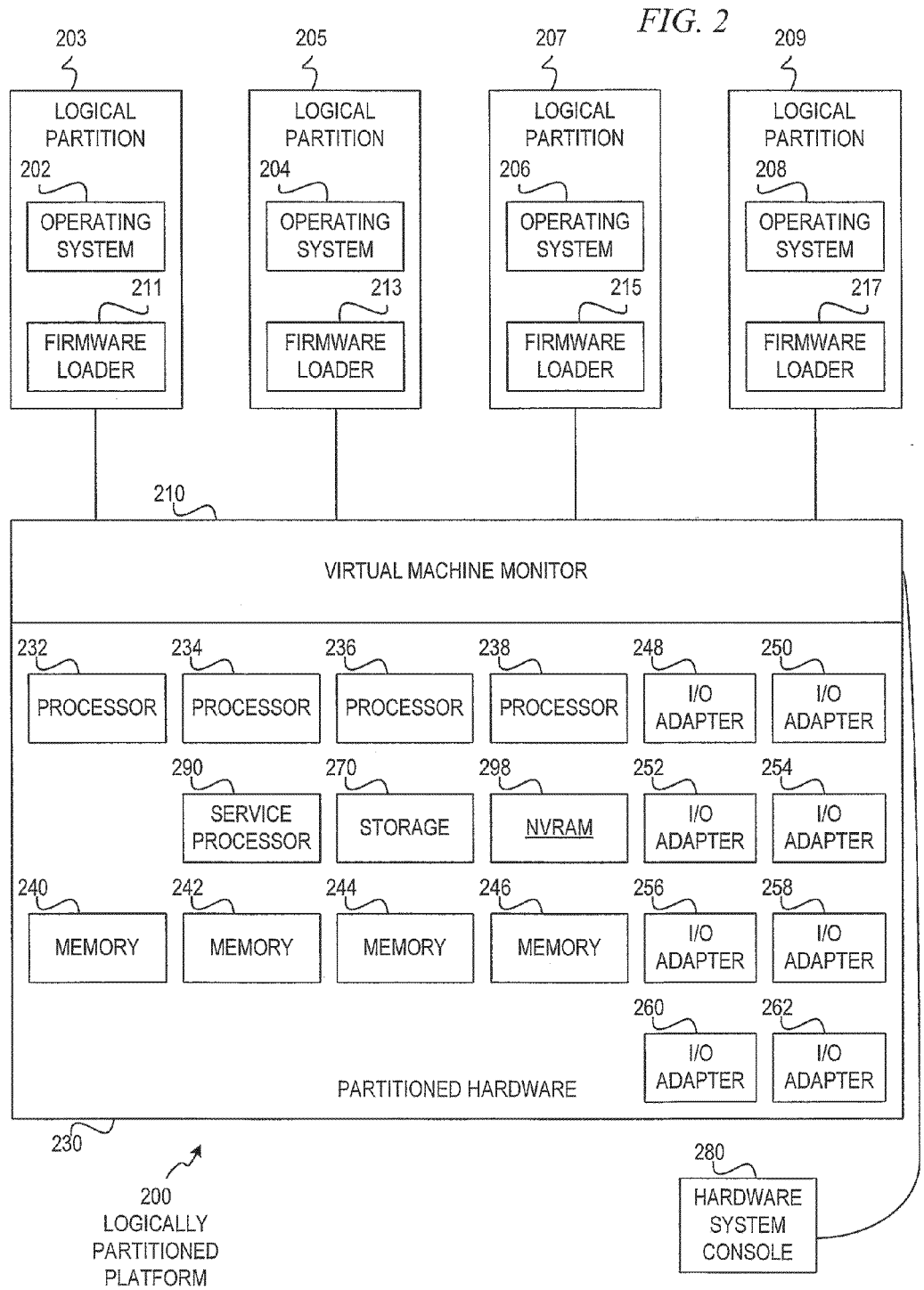
FIG. 2 depicts a block diagram of an exemplary logically partitioned platform in which the illustrative embodiments may be implemented.

Thus, the illustrative embodiments may be utilized in many different types of data processing environments including a distributed data processing environment, a single data processing device, or the like. In order to provide a context for the description of the specific elements and functionality of the illustrative embodiments, FIGS. 1 and 2 are provided hereafter as example environments in which aspects of the illustrative embodiments may be implemented. While the description following FIGS. 1 and 2 will focus primarily on a single data processing device implementation of a mechanism that controls the latency of exit of a virtual processor, this is only an example and is not intended to state or imply any limitation with regard to the features of the present invention. To the contrary, the illustrative embodiments are intended to include distributed data processing environments as well.

With reference now to the figures and in particular with reference to FIGS. 1-2, example diagrams of data processing environments are provided in which illustrative embodiments of the present invention may be implemented. It should be appreciated that FIGS. 1-2 are only examples and are not intended to assert or imply any limitation with regard to the environments in which aspects or embodiments of the present invention may be implemented. Many modifications to the depicted environments may be made without departing from the spirit and scope of the present invention.

In the illustrative embodiments, a computer architecture is implemented as a combination of hardware and software. The software part of the computer architecture may be referred to as microcode or millicode. The combination of hardware and software creates an instruction set and system architecture that the rest of the computer's software operates on, such as Basic Input/Output System (BIOS), Virtual Machine Monitors (VMM), Hypervisors, applications, etc. The computer architecture created by the initial combination is immutable to the computer software (BIOS, etc), except through defined interfaces which may be few.

Referring now to the drawings and in particular to FIG. 1, there is depicted a block diagram of a data processing system with which aspects of the illustrative embodiments may advantageously be utilized. As shown, data processing system 100 includes processor units 111a-111n. Each of processor units 111a-111n includes a processor and a cache memory. For example, processor unit 111a contains processor 112a and cache memory 113a, and processor unit 111n contains processor 112n and cache memory 113n.

Processor units 111a-111n are connected to main bus 115. Main bus 115 supports system planar 120 that contains processor units 111a-111n and memory cards 123. System planar 120 also contains data switch 121 and memory controller/cache 122. Memory controller/cache 122 supports memory cards 123 that include local memory 116 having multiple dual in-line memory modules (DIMMs).

Data switch 121 connects to bus bridge 117 and bus bridge 118 located within native I/O (NIO) planar 124. As shown, bus bridge 118 connects to peripheral components interconnect (PCI) bridges 125 and 126 via system bus 119. PCI bridge 125 connects to a variety of I/O devices via PCI bus 128. As shown, hard disk 136 may be connected to PCI bus 128 via small computer system interface (SCSI) host adapter 130. Graphics adapter 131 may be directly or indirectly connected to PCI bus 128. PCI bridge 126 provides connections for external data streams through network adapter 134 and adapter card slots 135a-135n via PCI bus 127.

Industry standard architecture (ISA) bus 129 connects to PCI bus 128 via ISA bridge 132. ISA bridge 132 provides interconnection capabilities through NIO controller 133 having serial connections Serial 1 and Serial 2. A floppy drive connection, keyboard connection, and mouse connection are provided by NIO controller 133 to allow data processing system 100 to accept data input from a user via a corresponding input device. In addition, non-volatile RAM (NVRAM) 140, connected to ISA bus 129, provides a non-volatile memory for preserving certain types of data from system disruptions or system failures, such as power supply problems. System firmware 141 is also connected to ISA bus 129 for implementing the initial Basic Input/Output System (BIOS) functions. Service processor 144 connects to ISA bus 129 to provide functionality for system diagnostics or system servicing.

The operating system (OS) is stored on hard disk 136, which may also provide storage for additional application software for execution by a data processing system. NVRAM 140 is used to store system variables and error information for field replaceable unit (FRU) isolation. During system startup, the bootstrap program loads the operating system and initiates execution of the operating system. To load the operating system, the bootstrap program first locates an operating system kernel image on hard disk 136, loads the OS kernel image into memory, and jumps to an initial address provided by the operating system kernel. Typically, the operating system is loaded into random-access memory (RAM) within the data processing system. Once loaded and initialized, the operating system controls the execution of programs and may provide services such as resource allocation, scheduling, input/output control, and data management.

The illustrative embodiment may be embodied in a variety of data processing systems utilizing a number of different hardware configurations and software such as bootstrap programs and operating systems. The data processing system 100 may be, for example, a stand-alone system or part of a network such as a local-area network (LAN) or a wide-area network (WAN). As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

With reference now to FIG. 2, a block diagram of an exemplary logically partitioned platform is depicted in which the illustrative embodiments may be implemented. The hardware in logically partitioned platform 200 may be implemented, for example, using the hardware of data processing system 100 in FIG. 1.

Logically partitioned platform 200 includes partitioned hardware 230, operating systems 202, 204, 206, 208, and virtual machine monitor 210. Operating systems 202, 204, 206, and 208 may be multiple copies of a single operating system or multiple heterogeneous operating systems simultaneously run on logically partitioned platform 200. These operating systems may be implemented, for example, using IBM® i, which is designed to interface with a virtualization layer, such as partition management firmware, e.g., a hypervisor. IBM® i is used only as an example in these illustrative embodiments. Of course, other types of operating systems, such as AIX® and Linux®, may be used depending on the particular implementation. Operating systems 202, 204, 206, and 208 are located in logical partitions 203, 205, 207, and 209, respectively.

Hypervisor software is an example of software that may be used to implement platform (in this example, virtual machine monitor 210) and is available from International Business Machines Corporation. Firmware is "software" stored in a memory chip that holds its content without electrical power, such as, for example, a read-only memory (ROM), a programmable ROM (PROM), an erasable programmable ROM (EPROM), and an electrically erasable programmable ROM (EEPROM).

Logical partitions 203, 205, 207, and 209 also include partition firmware loader 211, 213, 215, and 217. Partition firmware loader 211, 213, 215, and 217 may be implemented using IPL or initial boot strap code, IEEE-1275 Standard Open Firmware, and runtime abstraction software (RTAS), which is available from International Business Machines Corporation.

When logical partitions 203, 205, 207, and 209 are instantiated, a copy of the boot strap code is loaded into logical partitions 203, 205, 207, and 209 by virtual machine monitor 210. Thereafter, control is transferred to the boot strap code with the boot strap code then loading the open firmware and RTAS. The processors associated or assigned to logical partitions 203, 205, 207, and 209 are then dispatched to the logical partition's memory to execute the logical partition firmware.

Partitioned hardware 230 includes a plurality of processors 232-238, a plurality of system memory units 240-246, a plurality of input/output (I/O) adapters 248-262, and storage unit 270. Each of the processors 232-238, memory units 240-246, NVRAM storage 298, and I/O adapters 248-262 may be assigned to one of multiple logical partitions 203, 205, 207, and 209 within logically partitioned platform 200, each of which corresponds to one of operating systems 202, 204, 206, and 208.

Virtual machine monitor 210 performs a number of functions and services for logical partitions 203, 205, 207, and 209 to generate and enforce the partitioning of logical partitioned platform 200. Virtual machine monitor 210 is a firmware-implemented virtual machine identical to the underlying hardware. Thus, virtual machine monitor 210 allows the simultaneous execution of independent OS images 202, 204, 206, and 208 by virtualizing all the hardware resources of logical partitioned platform 200.

Service processor 290 may be used to provide various services, such as processing of platform errors in logical partitions 203, 205, 207, and 209. Service processor 290 may also act as a service agent to report errors back to a vendor, such as International Business Machines Corporation. Operations of the different logical partitions may be controlled through a hardware system console 280. Hardware system console 280 is a separate data processing system from which a system administrator may perform various functions including reallocation of resources to different logical partitions.

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the symmetric multiprocessing (SMP) system mentioned previously, without departing from the spirit and scope of the present invention.

Figure 3:
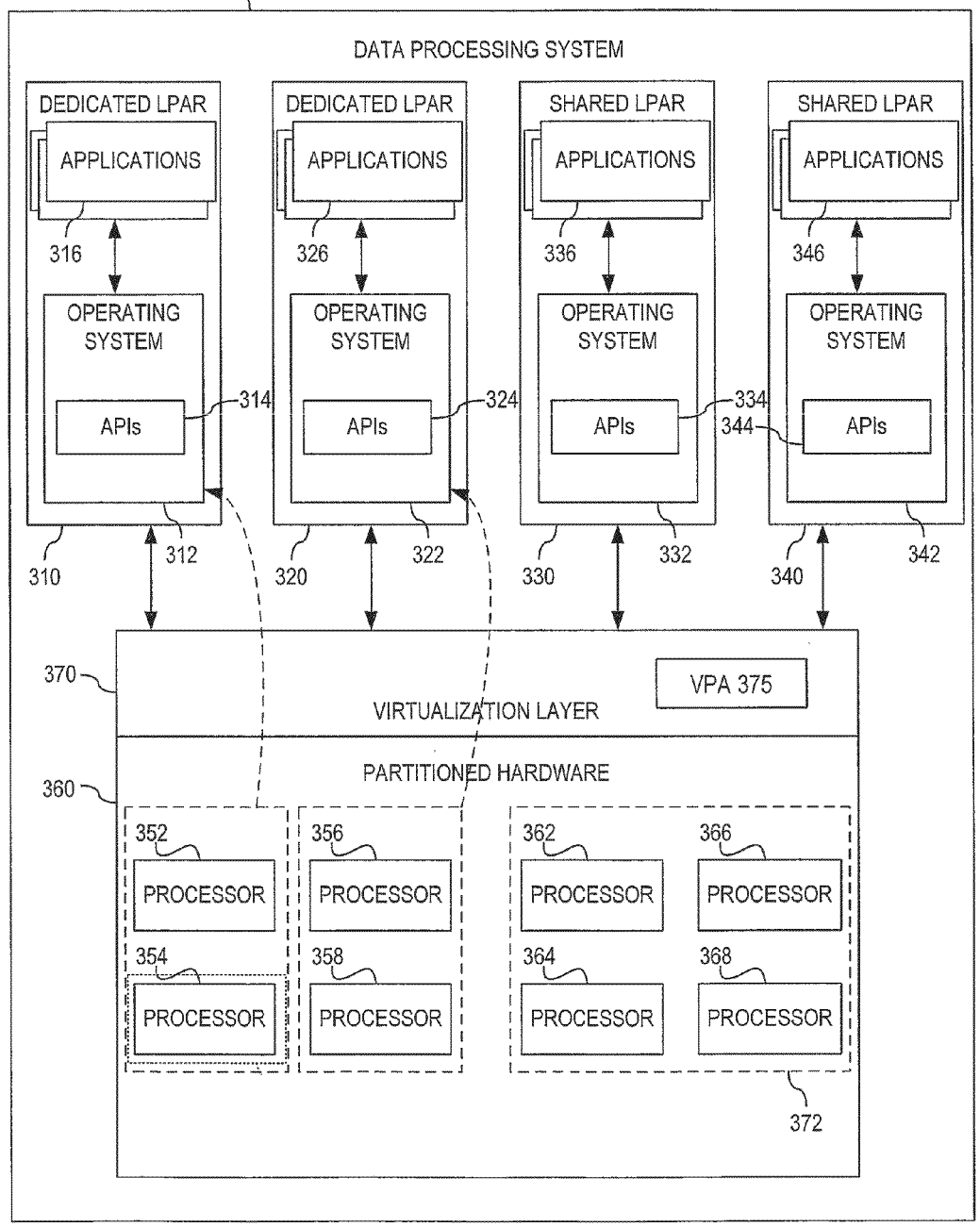
FIG. 3 depicts an exemplary block diagram illustrating a data processing system with a virtualized environment in accordance with an illustrative embodiment.

FIG. 3 depicts an exemplary block diagram illustrating a data processing system with a virtualized environment in accordance with an illustrative embodiment. Logically partitioned data processing system 300 has a plurality of logical partitions (LPARs) 310, 320, 330 and 340, which may also be referred to as clients or initiators. LPAR 310 has an instance of an operating system (OS) 312 with a set of application programming interfaces (APIs) 314 and one or more applications 316 running LPAR 320 has OS 322 with APIs 324 and one or more applications 326. LPAR 330 has OS 332 with APIs 334 and one or more applications 336. LPAR 340 has OS 342 with APIs 344 and one or more applications 346. While logically partitioned data processing system 300 illustrates only LPARs 310, 320, 330, and 340, the illustrative embodiments are not limited to such. Rather, any number of LPARs may be utilized with the mechanisms of the illustrative embodiments without departing from the spirit and scope of the present invention.

LPARs 310, 320, 330, and 340 may communicate with one another through virtualization layer 370. Virtualization layer 370 may be software that performs communications and resource management to allow multiple instances of OSs 312, 322, 332, and 342 to run on logically partitioned data processing system 300 at the same time. Virtualization layer 370 performs tasks such as processor time slice sharing, memory allocation, or the like. Virtualization layer 370 may be, for example, a hypervisor or a virtual machine monitor, such as virtual machine monitor 210 of FIG. 2.

Each OS 312, 322, 332, and 342 registers with virtualization layer 370 a virtual processor area (VPA) 375 for each of the particular OS's assigned virtual processors 352, 354, 356, 358, 362, 364, 366, and/or 368. VPA 375 is a per-virtual processor, two-way communication area between the particular OS 312, 322, 332, and 342 and the virtualization layer 370.

VPA 375 includes several fields of information pertaining to its corresponding virtual processor 352, 354, 356, 358, 362, 364, 366, or 368. One of the fields included in VPA 375 is an idle flag. Typically, when OS 312, 322, 332, or 342 enters its idle process, the particular idle OS sets the VPA idle flag. When work becomes again available for the corresponding virtual processor 352, 354, 356, 358, 362, 364, 366, or 368, or when an interrupt is received on the corresponding virtual processor 352, 354, 356, 358, 362, 364, 366, or 368, the OS 312, 322, 332, or 342 corresponding to the interrupted virtual processor clears the VPA idle flag.

In this example, logically partitioned platform 300 may comprise dedicated LPARs 310 and 320, shared LPARs 330 and 340, and virtual processors 352, 354, 356, 358, 362, 364, 366, and 368 within partitioned hardware 360 under control of virtualization layer 370. Virtual processors 352 and 354 may be dedicated resources and may be assigned to dedicated LPAR 310 as whole units by virtualization layer 370. Virtual processors 356 and 358 may also be dedicated resources and may be assigned to dedicated LPAR 320 as whole units by virtualization layer 370. However, virtual processor 362, 364, 366, and 368 may be part of shared processor pool 372 and may be configured by virtualization layer 370 based on the requirements of shared LPARs 330 and 340. That is, virtualization layer 370 may allocate one or more of virtual processors 362, 364, 366, and 368 from shared processor pool 372 to shared LPARs 330 and 340.

As an example of the decisions made by an operating system within logically partitioned platform 300, an operating system, such as OS 312, determines whether the workload for virtual processors 352 and 354 is below a certain threshold (i.e., when a executing thread in a dedicated LPAR 310 of OS 312 is idle). If OS 312 determines that the workload for virtual processors 352 and 354 of dedicated LPAR 310 is below the predetermined threshold, OS 312 calls virtualization layer 370 in order for virtualization layer 370 to place the CPU corresponding to virtual processor 352 or 354 in a deeper, low-power idle state. On IBM® POWER™ Architecture Platform Reference (PAPR) platforms, this call to virtualization layer 370 is named "h_cede", since OS 312 is ceding control of its virtual processor 352 or 354.

When OS 312 calls virtualization layer 370 to place an idle virtual processor 352 or 354 in an idle state, OS 312 has a particular expectation regarding the virtual processor's latency of exit from its idle state. According to one example, OS 312 chooses either virtual processor 352 or 354 (for this example virtual processor 354) for folding. Processor folding is a technique used by an OS to steer work away from one or more of its virtual processors. As the CPU utilization of a logical partition decreases below a threshold, the OS will fold a virtual processor. In this regard, OS 312 prevents any further workload to be queued up for chosen virtual processor 354, disables interrupts to processor 354. Alternatively, if OS 312 determines that processor 354 is folded and the workload for processor 352 is above a certain threshold, then OS 312 chooses virtual processor 354 for unfolding and enables interrupts to virtual processor 354, which allows work to be queued for virtual processor 354, or the like.

Folding/unfolding decisions are evaluated by the OS on a time-scale of seconds. Processor folding in micro-partitions helps with the performance of the shared processor pool by reducing dispatching. Processor folding in dedicated processor partitions helps with a) power savings and/or b) improved donation to a shared processor pool.

According to the example above, if OS 312 folds its virtual processor 354, OS 312 generally has no expectation that virtual processor 354 will respond to Input/Output (I/O) or timer interrupts. Moreover, OS 312 expects to regain control of virtual processor 354 in at most, for example, one second after virtual processor 354 is awakened by OS 312. However, in other exemplary idle management scenarios, the OS may tolerate a latency of only a few micro-seconds when the virtual processor exits its idle state and the OS expects the same latency when the virtual processor is presented an I/O or timer interrupt.

Figure 4:
FIG. 4 depicts an exemplary cede latency settings record corresponding to an idle state of a central processing unit (CPU) corresponding to a virtual processor in accordance with an illustrative embodiment.

To ensure that OS 312 determines the correct idle state that is to be assigned by virtualization layer 370 to an idling virtual processor 354, a Cede Latency Settings Information (CLSI) system is generated by virtualization layer 370 and communicated to OS 312. The CLSI system parameters/data inform OS 312 of the maximum latency to wake up from the various platform-supported processor sleep states that OS 312 might employ for its virtual processors 352 and 354. Referring now to FIG. 4, an exemplary record 400 of a CLSI table is shown, according to one embodiment of the invention. In practice, CLSI table includes a plurality of records, each record corresponding to a particular platform-supported idle state. However, for purposes of simplicity, a single record 400 of the CLSI table is shown. Record 400 corresponds to a generic idle state. In general, the number of idle states and the latency of exit out of the idle state will vary with processor implementation and, therefore, from platform to platform.

According to one implementation, the idle states are known as "Doze", which is the shallowest idle state, "Nap", which is the idle state of intermediate depth, and "Sleep", which is the deepest idle state. The "Doze" idle state loses the least amount of processor resources, has the lowest latency of exit, and saves the least amount of power. At the other end of the spectrum of idle states, the "Sleep" state loses the most processor resources, has the highest latency of exit, and saves the most amount of power.

The record 400 in a generic CLSI table includes various fields 402-406 that are ordered in a NULL terminated parameter string. The first field, titled "Cede Latency Specifier Value" 402, identifies the particular idle state that is described (e.g., "Doze", "Nap", "Sleep", etc.). The second field, titled "Maximum Wakeup Latency in Time Base Ticks" 404, identifies the maximum amount of time that it takes for a virtual processor to exit its idle state. The third field, titled "Virtual Processor Responsive to . . . " 406, identifies a particular event, such as an external interrupt, which may or may not reactivate the idle virtual processor. Reactivation depends upon the particular idle state that is assigned to the virtual processor, which takes into account the policies and workloads that are present. This ensures that gratuitous wakeups of the idle virtual processor are avoided. Each of fields 402-406 is associated with a field length (reflected in column 408), and a particular value (reflected in column 410).

The CLSI system is independent of the number of idle states implemented by a processor implementation and the physical characteristics of the idle state, (e.g., exit latency of the virtual processor). Furthermore, the CLSI system can accommodate partition migration across computer systems having different processor implementations.

As will be appreciated by one skilled in the art, the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in any one or more computer readable medium(s) having computer usable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, device, or any suitable combination of the foregoing. More specific examples (a non-exhaustive list) of the computer readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in a baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Computer code embodied on a computer readable medium may be transmitted using any appropriate medium, including but not limited to wireless, wireline, optical fiber cable, radio frequency (RF), etc., or any suitable combination thereof Computer program code for carrying out operations for aspects of the present invention may be written in any combination of one or more programming languages, including an object oriented programming language such as Java™ language, Smalltalk™ language, C++, or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

Figure 5:
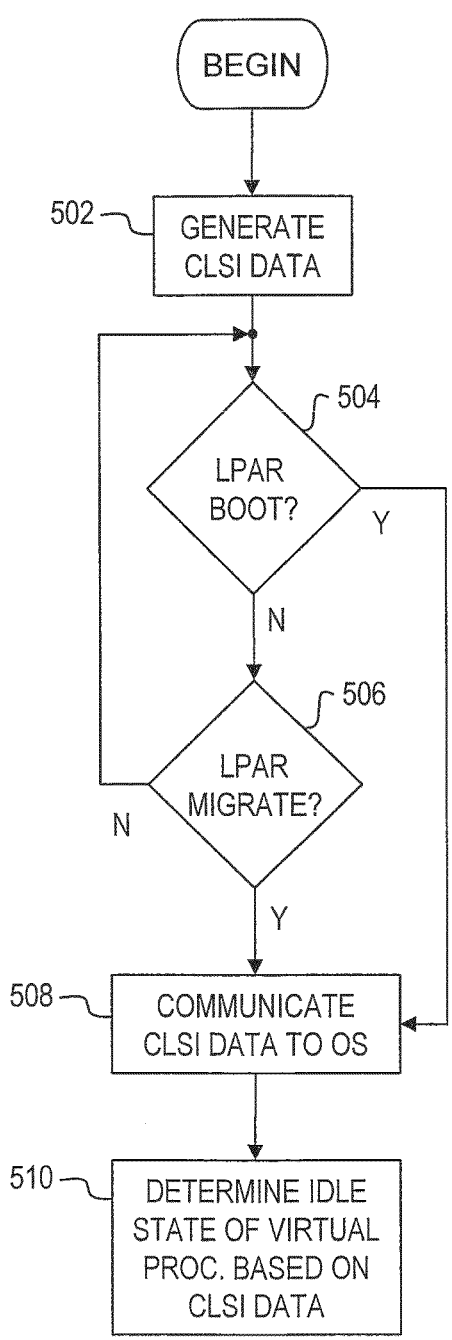
FIG. 5 depicts an example of the operation performed by a virtualization layer in communicating Cede Latency Settings Information (CLSI) data to an operating system (OS), in accordance with an illustrative embodiment.
Figure 6:
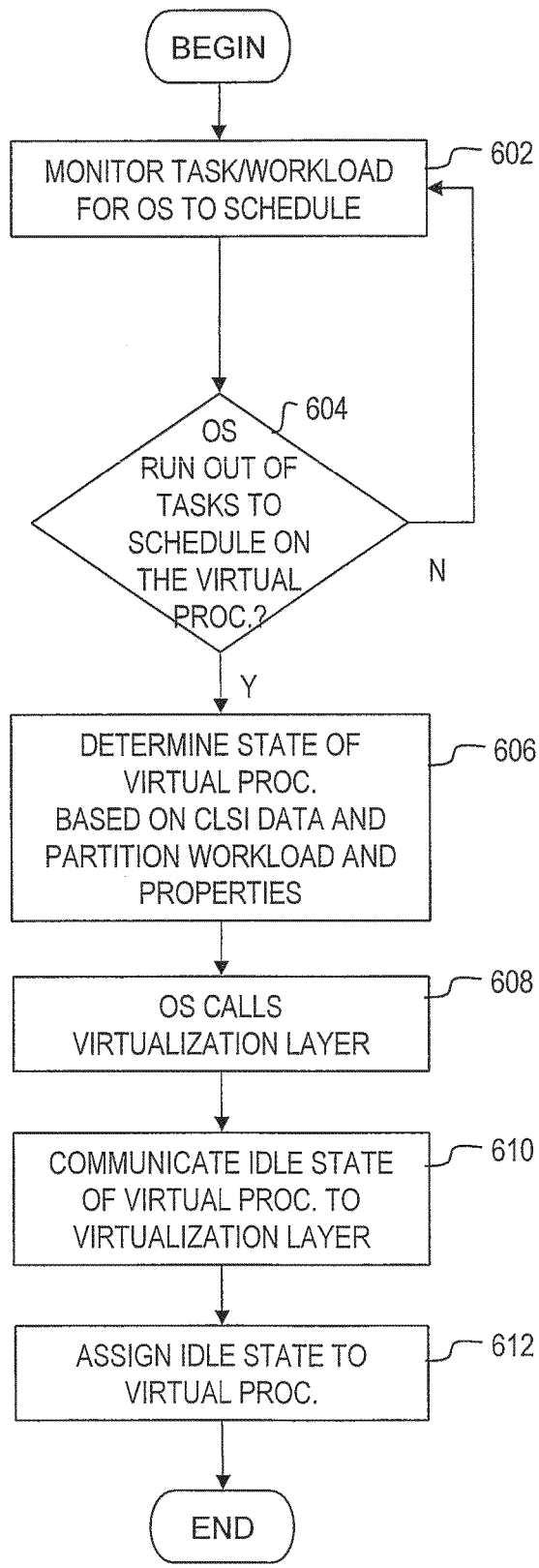
FIG. 6 depicts an example of the operation performed by OS and virtualization layer in determining and assigning a particular idle state to a virtual processor in accordance with an illustrative embodiment.
Figure 7:
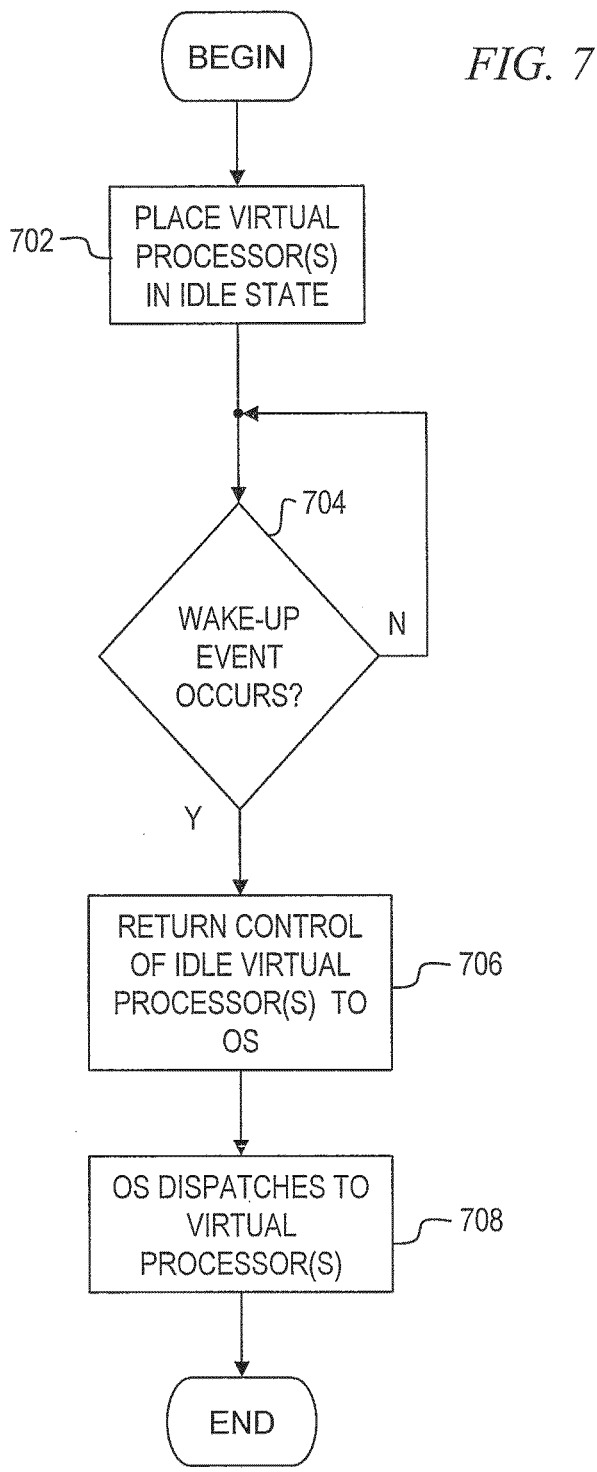
FIG. 7 depicts an example of the operation performed by the virtualization layer and the OS in managing events that interrupt a virtual processor in accordance with an illustrative embodiment.

Referring now to FIGS. 5-7, these figures provide flowcharts outlining example operations of controlling the depth and latency of exit of a virtual processor's idle state in accordance with an illustrative embodiment. While FIGS. 5-7 are described in relation to only one OS assigning an idle state to a single virtual processor, one of ordinary skill in the art would realize that the operation may be performed with any number of operating systems which can assign (via e.g., a hypervisor) a particular idle state to any number of virtual processors for any number of partitions without departing from the spirit and scope of the invention.

FIG. 5 depicts an example of the operation performed by an OS and a virtualization layer in determining and assigning a particular idle state to a virtual processor in accordance with an illustrative embodiment. As the operation begins, virtualization layer 370 (i.e., hypervisor) generates cede latency setting information (CLSI) data (step 502), as discussed earlier in reference to CLSI table record 400 of FIG. 4. If at step 504 the LPAR (e.g., LPAR 310) is booted, virtualization layer 370 communicates CLSI data (i.e., record 400) to OS corresponding to the booted LPAR (e.g., OS 312) (step 508). However, if at step 504 the LPAR is not booted, the method proceeds to decision step 506. If at step 506 the LPAR has migrated to another platform, the method continues to step 508, as described above. From step 508, the method iteratively returns to decision step 504.

FIG. 6 depicts an example of the operation performed by OS and virtualization layer in determining and assigning a particular idle state to a virtual processor in accordance with an illustrative embodiment. As the operation begins, the OS (e.g., OS 312) monitors its tasks/workload (step 602). If at decision step 604, the OS determines that it has run out of tasks to schedule on its virtual processor(s), OS determines a particular idle state of its virtual processor(s) under its control (e.g., 352, 354) (step 606). The above determination is based upon CLSI data record 400, as well as the policies and workload of the LPAR. The OS calls virtualization layer 370 to place the CPU corresponding to virtual processor 352 and/or 354 in a low-power, idle state (step 608). However, if the OS determines that it has not run out of tasks to schedule on its virtual processor(s), the method returns to decision step 602 for continued monitoring by the OS. OS communicates the idle state of its virtual processor(s) to virtualization layer 370 (step 610). In this regard, OS communicates the particular idle state via one or more fields in virtual processor area (VPA) 375. Virtualization layer 370 assigns the particular idle state and the idle state's wake-up characteristics directed from OS to the virtual processor(s) selected (step 612), with the operation terminating thereafter.

FIG. 7 depicts an example of the operation performed by the virtualization layer and the OS in managing events that interrupt a virtual processor in accordance with an illustrative embodiment. Such events include, but are not limited to timer interrupts, Input/Output (I/O) interrupts, and/or calls by the OS which had previously ceded control of interrupted virtual processor. As the operation begins, virtualization layer (e.g., 370) places the virtual processor(s) (e.g., 352, 354) under the OS's (e.g., 312) control in a particular idle state (step 702). If an event wakes up virtual processor(s) 352, 354 (decision step 704), control of virtual processor(s) 352, 354 is returned to OS 312 (step 706) by virtualization layer 370. OS 312 can then dispatch work to virtual processor(s) 352, 354, with the operation terminating thereafter.

The flowcharts or block diagrams in FIGS. 5-7 illustrate the architecture, functionality, and operation of possible implementations of systems, methods and computer program products according to one embodiment of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in FIGS. 5-7. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a logically partitioned data processing system, for controlling depth and latency of exit of a virtual processor's idle state, the method comprising:
   generating, by a virtualization layer, a cede latency settings information (CLSI) data, wherein said CLSI data includes available idle states and wake-up characteristics for virtual processors, and wherein said wake-up characteristics of said CLSI data includes a maximum wake-up latency in time base ticks;
   responsive to booting a logical partition, communicating, by said virtualization layer, said CLSI data to an operating system (OS) of said logical partition;
   determining, by said OS based upon said CLSI data, a particular idle state of a virtual processor under a control of said OS; and
   responsive to said OS calling said virtualization layer, communicating, by said OS, said particular idle state of said virtual processor to said virtualization layer for assigning said particular idle state and wake-up characteristics to said virtual processor.

2. The method of claim 1, further comprising:
   responsive to migrating said logical partition, communicating, by said virtualization layer, said CLSI data to an operating system (OS) of said logical partition.

3. The method of claim 1, wherein said available idle states corresponding to said virtual processor is communicated via a cede latency specifier value.

4. The method of claim 1, wherein said communicating said particular idle state of said virtual processor to said virtualization layer further comprising: communicating said particular idle state via a field in a virtual processor area (VPA).

5. The method of claim 1, wherein said determining said particular idle state of a virtual processor under a control of said OS further is based upon a workload and at least one policy of said OS.

6. The method of claim 1, wherein said CLSI data is communicated to said OS in a NULL terminated parameter string.

7. The method of claim 1, wherein said virtual processor is a dedicated virtual processor.

8. The method of claim 1, wherein said virtual processor is a shared virtual processor.

* * * * *